Dec. 18, 1951     C. G. W. DIERKING     2,579,178
ELECTRIC DOG TRAINING DEVICE
Filed Feb. 4, 1947     2 SHEETS—SHEET 1
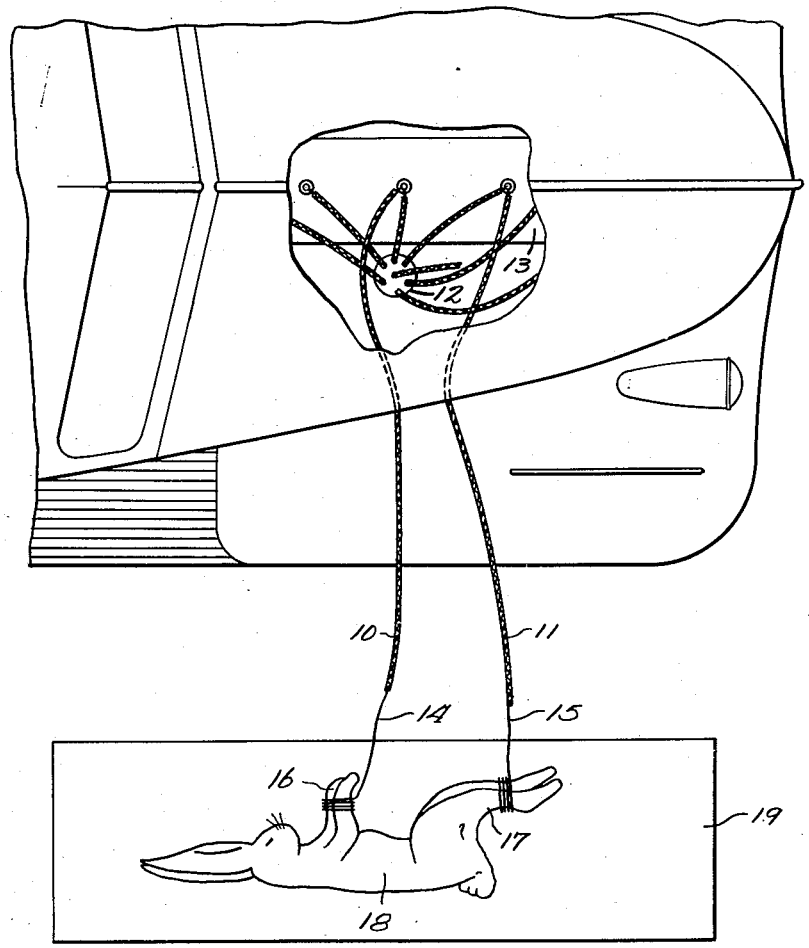
INVENTOR.
Charles G. W. Dierking,
BY Victor J. Evans & Co.
ATTORNEYS

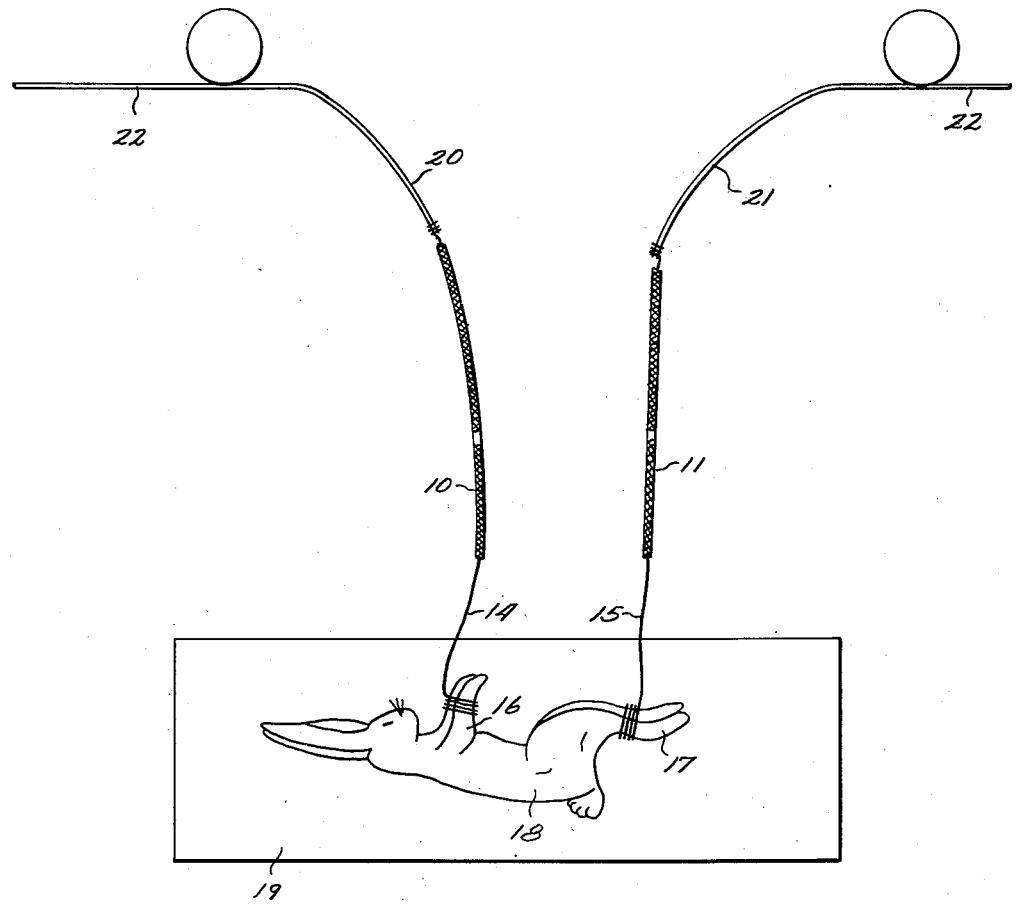

Patented Dec. 18, 1951

2,579,178

UNITED STATES PATENT OFFICE 2,579,178

ELECTRIC DOG TRAINING DEVICE

Charles G. W. Dierking, Aurora, Ind.

Application February 4, 1947, Serial No. 726,320

1 Claim. (Cl. 119—29)

The present invention relates to a method and apparatus for training dogs to avoid certain animals and it consists in the combinations, constructions and arrangements of parts herein described and claimed.

Generally the invention comprises an apparatus consisting of a source of proper current, suitable connections and a recently killed animal of the type it is desired to teach a dog to avoid, the animal being placed in series with the connections to the source of current and a method of using such apparatus with a dog whereby the dog will be quickly taught to avoid such animal in the future.

It is accordingly an object of the invention to provide an apparatus for training dogs to avoid certain animals which apparatus is extremely simple and inexpensive to manufacture and to operate.

A further object of the invention is to provide a method of using apparatus as above described in such a manner that a dog may be very rapidly and thoroughly trained to avoid certain animals in the future.

Other and further objects of the invention will become apparent from a reading of the following specification taken in conjunction with the drawings, in which:

Figure 1 is a plan view of an apparatus embodying the invention, and

Figure 2 is a plan view of another embodiment of the invention.

Referring more particularly to the drawings, there is shown therein a pair of wires 10 and 11 connected at one end to terminals in a distributor 12 of an automobile engine 13 which is grounded to the chassis of the automobile in the conventional manner. Of course, it will be readily apparent that the wires may be connected to spark plugs which are electrified by the operation of the automobile through the conventional battery supplying current to the automobile or to some other source of current, such as a storage battery, for example. The other ends of the wires are bared as shown at 14 and 15 and wrapped about the forelegs 16 and rear legs 17, respectively, of a rabbit 18 or other animal it is desired to train a dog to avoid.

In practice, the legs 16 and 17 are first skinned before the wires are wrapped therearound. The animal 18 is placed upon a slab of wood 19 or the like and, preferably, insulated therefrom by a slab 9 of porcelain or other dielectric material.

In the form of the invention shown in Figure 2, wherein like reference characters are used for similar parts, the wires 10 and 11 are connected to two ends 20 and 21 of an electrified fence 22 which depends upon a source of current from a storage battery or an electrical current supply source.

In use, when it is desired to train a dog to hunt only, for example, racoon and to avoid rabbits and other animals abounding in the particular neighborhood, the wires 10 and 11 are connected to the means previously set forth that are connected to a source of current as set forth and run to a suitable distance therefrom in order to avoid suspicion on the part of the dog. An animal it is desired the dog to avoid as, for example, a rabbit 18 is placed and electrically connected as above described and its body cut so that the intestines are exposed. Before placing the animal in such position, however, and without the dog's knowledge, a trail is made with the animal 18 to the final position as described. Care must be taken to provide an electric current of sufficient power to shock without injuring the dog. The current is then connected and the dog allowed to follow the trail. When the dog comes upon and bites or otherwise contacts the rabbit, he will be shocked. The trainer may then administer another shock if he feels it to be necessary by forcing the dog's muzzle into the exposed intestines of the rabbit.

The same procedure may then be followed with other animals replacing the rabbit after which, in actual hunting, the dog will avoid all but the particular animal he is to hunt and by which he has never been shocked.

What is claimed is:

In a device for training dogs comprising in combination a block of wood adapted to be placed on the ground, a slab of insulating material on said block having thereon a carcass of an animal, a source of electric current supply comprising a suitably grounded combustion engine having spark plugs therein, leads extending from said spark plugs to the legs of the carcass to provide a source of current potential through said carcass so that when a dog comes in contact with the carcass the dog will be given an electrical shock.

CHARLES G. W. DIERKING.

REFERENCES CITED

The following references are of record in the file of this patent:

UNITED STATES PATENTS

| Number | Name | Date |
|--------|------|------|
| 817,448 | Shanahan | Apr. 10, 1906 |

FOREIGN PATENTS

| Number | Country | Date |
|--------|---------|------|
| 289,757 | Germany | Jan. 17, 1916 |